United States Patent
Ding et al.

(10) Patent No.: US 12,275,830 B2
(45) Date of Patent: Apr. 15, 2025

(54) SUSTAINED-RELEASE ANTIBACTERIAL FILM AND PREPARATION METHOD THEREOF

(71) Applicants: ZHEJIANG UNIVERSITY, Zhejiang (CN); JIANGNAN UNIVERSITY, Jiangsu (CN)

(72) Inventors: Tian Ding, Zhejiang (CN); Mofei Shen, Zhejiang (CN); Donghong Liu, Zhejiang (CN); Wei Zhao, Zhejiang (CN); Jinsong Feng, Zhejiang (CN)

(73) Assignees: ZHEJIANG UNIVERSITY (CN); JIANGNAN UNIVERSITY (CN)

( * ) Notice: Subject to any disclaimer, the term of this patent is extended or adjusted under 35 U.S.C. 154(b) by 0 days.

(21) Appl. No.: 17/909,285

(22) PCT Filed: Mar. 11, 2022

(86) PCT No.: PCT/CN2022/080307
§ 371 (c)(1),
(2) Date: Sep. 2, 2022

(87) PCT Pub. No.: WO2023/082508
PCT Pub. Date: May 19, 2023

(65) Prior Publication Data
US 2024/0199826 A1   Jun. 20, 2024

(30) Foreign Application Priority Data
Nov. 10, 2021   (CN) .......................... 202111326576.3

(51) Int. Cl.
*C08J 5/18* (2006.01)
*C08K 3/08* (2006.01)
*C08K 5/13* (2006.01)

(52) U.S. Cl.
CPC .................. *C08J 5/18* (2013.01); *C08K 5/13* (2013.01); *C08J 2383/04* (2013.01);
(Continued)

(58) Field of Classification Search
CPC .............. C08J 2405/16; C08J 2383/04; C08K 2003/0806; C08K 2201/011; C08K 5/13; C08L 83/04; C09D 5/1675
See application file for complete search history.

(56) References Cited

U.S. PATENT DOCUMENTS

| | | | |
|---|---|---|---|
| 2012/0070904 A1* | 3/2012 | Stoddart | C08B 37/0015 977/774 |
| 2020/0164342 A1* | 5/2020 | Stoddart | B01D 53/02 |
| 2022/0282046 A1* | 9/2022 | Li | C08B 37/0012 |

FOREIGN PATENT DOCUMENTS

| | | | | |
|---|---|---|---|---|
| CN | 111440325 | * | 7/2020 | ........... C08G 83/008 |
| WO | WO2017148439 | * | 9/2017 | ........... C08G 83/008 |

OTHER PUBLICATIONS

Luo et al., "Co-delivery of superfine nano-silver and solubilized sulfadiazine for enhanced antibacterial functions", International Journal of Pharmaceutics, May 7, 2020, vol. 584, 119407, ISSN 0378-5173, https://doi.org/10.1016/j.ijpharm.2020.119407 (Year: 2020).*

(Continued)

*Primary Examiner* — Michael C Romanowski
(74) *Attorney, Agent, or Firm* — Design IP (57) ABSTRACT

A method for preparing a sustained-release antibacterial film includes: (1) mixing a cyclodextrin metal-organic framework (CD-MOF) material with a silver nitrate short-chain alcohol solution to prepare an intermediate material A; (2) mixing the intermediate material A with a caffeic acid short-chain alcohol solution to prepare an intermediate material B; (3) dispersing the intermediate material B in a solvent, adding a polydimethylsiloxane main agent and a
(Continued)

PDMS auxiliary agent in sequence, and mixing well by stirring to obtain a casting solution; and (4) coating the casting solution on a film support material, conducting vacuum drying, and peeling off a film from the film support material to obtain the sustained-release antibacterial film. A mixed matrix-based film material in which the CD-MOF and the PDMS are physically blended is prepared based on CD-MOF and PDMS for the first time, and may be used in application researches of food, environment and other fields.

9 Claims, 10 Drawing Sheets

(52) U.S. Cl.
CPC ... *C08J 2405/16* (2013.01); *C08K 2003/0806* (2013.01); *C08K 2201/011* (2013.01)

(56) References Cited

OTHER PUBLICATIONS

Wei et al., "Nanoparticle Core/Shell Architectures within MOF Crystals Synthesized by Reaction Diffusion", Angew. Chem. Int. Ed., vol. 51, 7435-7439, Jul. 18, 2012, https://doi.org/10.1002/anie.201202549 (Year: 2012).*

Liu et al., "Microwave-Assisted Rapid Synthesis of γ-Cyclodextrin Metal-Organic Frameworks for Size Control and Efficient Drug Loading", Crystal Growth & Design, Feb. 20, 2017, vol. 17, Issue 4, 1654-1660, https://doi.org/10.1021/acs.cgd.6b01658 (Year: 2017).*

Yang et al., "Optimization of preparation process of ferulic acid/potassium/β-cyclodextrin metal organic framework inclusion complex", Chinese (China) Pharmacy, 2016, vol. 27, Issue 7, pp. 936-938, DOI: 10.6039/j.issn.1001-0408.2016.07.22 (Year: 2016).*

* cited by examiner

SUSTAINED-RELEASE ANTIBACTERIAL FILM AND PREPARATION METHOD THEREOF

CROSS REFERENCE TO RELATED APPLICATION

The present application is a U.S. National stage Application of PCT Application Serial No. PCT/CN2022/080307, filed Mar. 11, 2022, which claims the priority to Chinese Patent Application No. 202111326576.3, titled "sustained-release antibacterial film and preparation method thereof", filed with China National Intellectual Property Administration (CNIPA) on Nov. 10, 2021, which are incorporated herein by reference in their entireties.

TECHNICAL FIELD

The present disclosure relates to the technical field of sustained-release antibacterial materials, in particular to a sustained-release antibacterial film and a preparation method thereof.

BACKGROUND ART

Metal-organic frameworks (MOFs), as porous coordination materials composed of multidentate organic ligands and metal ions or metal clusters, are infinite network structures formed by coordination bond or covalent bond between the metal ion center and the organic ligand. The MOF is a rapidly-developing novel porous material with broad prospects for use due to large specific surface area, tunable functions, and high porosity.

However, if cyclodextrin metal-organic framework (CD-MOF) materials are used as carriers to load antibacterial substances, the easy disintegration of CD-MOF in water needs to be overcome. At present, there is no research on protecting the CD-MOF with polydimethylsiloxane (PDMS) to achieve sustained-release in water. Therefore, there is an urgent need to develop a CD-MOF-based material capable of achieving the sustained-release in water in the art.

SUMMARY

The present disclosure provides a sustained-release antibacterial film. The sustained-release antibacterial film is a water-responsive and sustained-release antibacterial film based on CD-MOF and PDMS, solving a problem that CD-MOF materials are easily soluble in water. Moreover, the PDMS protects the CD-MOF materials from burst release and disintegration in water, such that the sustained-release antibacterial film has a sustained-release effect in water, thus the sustained-release antibacterial function is realized.

In the present disclosure, a mixed matrix-based film material in which the CD-MOF and the PDMS are physically blended is prepared for the first time, and may be used in the application researches of food, environment and other fields.

The present disclosure provides a method for preparing sustained-release antibacterial film, including the following steps:

(1) mixing a cyclodextrin metal-organic framework (CD-MOF) material with a silver nitrate short-chain alcohol solution to prepare a nano-silver-loaded CD-MOF material, which is recorded as an intermediate material A;

(2) mixing the intermediate material A with a caffeic acid short-chain alcohol solution to prepare a CD-MOF material loaded with nano-silver and caffeic acid, which is recorded as an intermediate material B;

(3) dispersing the intermediate material B in a solvent, adding a PDMS prepolymer, adding a PDMS crosslinking agent after mixing, and mixing well by stirring to obtain a casting solution; and (4) coating the casting solution on a film support material, conducting vacuum drying, and peeling off a film from the film support material to obtain the sustained-release antibacterial film.

In one embodiment, the short-chain alcohol in step (1) and step (2) is anhydrous methanol or anhydrous ethanol. A same short-chain alcohol, preferably the anhydrous ethanol, is used in step (1) and step (2).

In one embodiment, in step (1), a concentration of the silver nitrate short-chain alcohol solution is 0.5 mM to 10 mM. A ratio of the CD-MOF and the silver nitrate in the silver nitrate short-chain alcohol solution is 100 mg:(0.0025-0.05) mmol. A time of the mixing is 10 h to 15 h.

In one embodiment, in step (2), a concentration of caffeic acid in the caffeic acid short-chain alcohol solution is 5 mg/mL to 10 mg/mL. A mass ratio of the intermediate material A and the caffeic acid in the caffeic acid short-chain alcohol solution is 1:(0.5-1.5). A time of the mixing is 12 h to 18 h.

In one embodiment, in step (1), a concentration of the silver nitrate short-chain alcohol solution is 5 mM to 7.5 mM. A ratio of the CD-MOF and silver nitrate in the silver nitrate short-chain alcohol solution is 100 mg:(0.0125-0.0375) mmol, a time of the mixing is 10 h to 15 h. In step (2), a concentration of the caffeic acid in the caffeic acid short-chain alcohol solution is 5 mg/mL to 10 mg/mL. A mass ratio of the intermediate material A and the caffeic acid in the caffeic acid short-chain alcohol solution is 1:(0.5-1). A time of the mixing is 12 h to 18 h.

In one embodiment, in step (3), the solvent is selected from the group consisting of acetonitrile, n-hexane, and n-heptane, preferably the acetonitrile. The intermediate material B is dispersed in the solvent at 5 mg/mL to 10 mg/mL. The intermediate material B is added at 2.5% to 20% of a total mass of an obtained mixture.

In one embodiment, the intermediate material B is added at preferably 10% to 20%, more preferably 13% to 18%, and most preferably 15% of the total mass of the obtained mixture.

In one embodiment, in step (3), the PDMS prepolymer includes a poly(dimethyl-methylvinylsiloxane) prepolymer and a trace amount of a platinum catalyst. The PDMS crosslinking agent include a prepolymer with a vinyl side chain and a crosslinking agent poly(dimethyl-methylhydrogenosiloxane). A mass ratio of the PDMS prepolymer and the PDMS crosslinking agent is 10:1. The PDMS prepolymer and the PDMS crosslinking agent are added in steps to promote the fully mixing of each component.

In one embodiment, in step (3), a time of the mixing well by stirring after adding the PDMS crosslinking agent is 8 h to 12 h.

In one embodiment, in step (4), the film support material is selected from the group consisting of polytetrafluoroethylene, polyvinylidene fluoride (PVDF), and polyethersulfone resin (PES resin). A coating thickness is 50 μm to 300 μm. The vacuum drying is conducted at 85° C. to 95° C. for 3 h to 5 h. Optionally, step (1) and step (2) each may include a post-treatment after the mixing. The post-treatment includes conducting centrifugation on a reaction solution, discarding a supernatant, and conducting vacuum drying.

In one embodiment, a method for preparing the CD-MOF material includes the following steps:
  ultrasonic mixing an aqueous solution dispersed with γ-cyclodextrin and potassium hydroxide and conducting a reaction in a water bath to obtain mixed solution, conducting an ultrasonic treatment on the mixed solution while adding polyethylene glycol to the mixed solution after the reaction in the water bath is completed, to obtain a crude product; and washing and drying the crude product to obtain the CD-MOF material; where
  in one embodiment, in the aqueous solution, a molar ratio of the γ-cyclodextrin and the potassium hydroxide is 1:(5-10); generally, potassium ions in the CD-MOF material are in a form of 8-coordination, making 6 γ-cyclodextrins form a minimum building unit of the CD-MOF, which is equivalent to 2 potassium ions paired with 1 γ-cyclodextrin, with a chemical formula of $[(C_{48}H_{80}O_{40}KOH)_2]_n$; in addition, excess potassium hydroxide is conducive to the participation of all γ-cyclodextrins in the reaction,
  in one embodiment, a molecular weight of the polyethylene glycol is 8,000, and a molar ratio of the polyethylene glycol and the γ-cyclodextrin is (0.06-0.07):1; and
  in one embodiment, a temperature of the reaction in the water bath is 55° C. to 65° C.

The present disclosure further provides a sustained-release antibacterial film prepared by the preparation method.

Compared with the prior art, the present disclosure has the following beneficial effects.

(1) The sustained-release antibacterial film has desirable water responsiveness; under an optimal addition mass fraction of CA@Ag@CD-MOF (15 wt %). The silver ion released by the sustained-release antibacterial film in water for 48 hours is 50 times that in ethanol. The caffeic acid released by the sustained-release antibacterial film in water for 48 hours is 55 times that in toluene.

(2) The sustained-release antibacterial film has desirable antibacterial properties: under the optimal addition mass fraction of CA@Ag@CD-MOF (15 wt %), the bactericidal effect of 7.18 log reduction against *Escherichia coli* 0157:H7 and 6.59 log reduction against *Staphylococcus aureus* may be achieved within 12 h and 36 h respectively by placing 3 cm$^2$ of the sustained-release antibacterial film material in 10 mL of a bacterial solution, (3) In the present disclosure, a mixed matrix-based film material in which the CD-MOF and the PDMS are physically blended is prepared based on CD-MOF and PDMS for the first time. The present disclosure further provides CA@Ag@CD-MOF/PDMS prepared by the preparation method, which may be used in the application researches of food, environment and other fields.

DETAILED DESCRIPTION OF THE EMBODIMENTS

The following clearly and completely describes the technical solutions of the present disclosure with reference to accompanying embodiments. Apparently, the described embodiments are merely some rather than all of the embodiments of the present disclosure. All other embodiments obtained by those of ordinary skill in the art based on the embodiments of the present disclosure without creative efforts should fall within the protection scope of the present disclosure.

Unless otherwise defined, all technical and scientific terms used herein have the same meaning as commonly understood by those skilled in the technical field of the present disclosure. The terms used in the specification of the present disclosure are merely for the purpose of describing specific embodiments, rather than to limit the present disclosure.

The present disclosure provides a mixed matrix-based film material based on physical blending for the first time. A CD-MOF material is added to a short-chain alcohol solution containing silver nitrate, and subjected to light-proof vibration to obtain a nano-silver-loaded CD-MOF, recorded as an intermediate material A. The nano-silver-loaded CD-MOF is added to a short-chain alcohol solution containing caffeic acid, and subjected to agitation and incubation in the dark to obtain a CD-MOF compound 1 loaded with caffeic acid and nano-silver, recorded as an intermediate material B. The compound 1 is placed in an acetonitrile solution of a PDMS main agent and stirred, added with a PDMS auxiliary agent, and vacuum drying is conducted to obtain a water-responsive sustained-release antibacterial film based on the CD-MOF material and the PDMS, namely a compound 2; where the PDMS main agent is a PDMS prepolymer, and the PDMS auxiliary agent is a PDMS crosslinking agent.

In an embodiment, the influence of different reaction conditions on the loading of nano-silver is compared during the preparation of loading silver. The preferred preparation conditions are: a concentration of silver nitrate in the silver nitrate ethanol solution is 2.5 mM to 7.5 mM, and a mass molar ratio of the CD-MOF material and the silver nitrate is 100 mg:(0.0125-0.0375) mmol. A time of the reaction is 10 h to 15 h.

Under comprehensive consideration, during loading the nano-silver, optimal preparation conditions are: a concentration of silver nitrate in the silver nitrate ethanol solution is 7.5 mM, and a mass molar ratio of the CD-MOF material and the silver nitrate is 100 mg: 0.0375 mmol. A time of the reaction is 12 h.

In an embodiment, during the preparation of loading caffeic acid, the influence of different reaction conditions on the loading of caffeic acid is compared. The preferred preparation conditions are: a concentration of caffeic acid in the caffeic acid ethanol solution is 5 mg/mL to 10 mg/mL. A mass ratio of the CD-MOF material (intermediate material A) loaded with nano-silver and the caffeic acid is 1:(0.5-1). A time of the mixing is 12 h to 18 h.

Under comprehensive consideration, optimal preparation conditions are: a concentration of caffeic acid in the caffeic acid ethanol solution is 8 mg/mL, a mass ratio of the CD-MOF material loaded with nano-silver and the caffeic acid is 1:0.8. A time of the mixing is 15 h.

In an embodiment, the compound 1 (intermediate material B) prepared under optimal conditions (the loading of nano-silver and the loading of caffeic acid each are conducted under optimal conditions) are used as a raw material, and mechanical properties (elongation at break and elastic modulus) and swelling degree in water of the compound 2 with different contents of the compound 1 (intermediate material B) are investigated: adding different mass fractions of nano-silver and caffeic acid-loaded CD-MOF (CA@Ag@CD-MOF) into an acetonitrile, n-hexane or n-heptane solution containing a PDMS matrix (including the PDMS main agent and the PDMS auxiliary agent) (a proportion of the compound 1 (intermediate material B) added is 2.5 wt %, 5 wt %, 10 wt %, 15 wt %, and 20 wt % of a total mass of the reaction solution, respectively), stirring for several hours, drying overnight and vacuumizing, and conducting a reaction at 90° C. for several hours under vacuum, to obtain a mixed matrix-based film (CA@Ag@CD-MOF/PDMS).

In this specific embodiment, the PDMS is a purchased commercial reagent produced by Dow Corning in the United States. The PDMS includes two components: a prepolymer A (PDMS main agent) and a crosslinking agent B (PDMS auxiliary agent). The prepolymer A includes mainly a poly(dimethyl-methylvinylsiloxane) prepolymer and a trace amount of a platinum catalyst. The crosslinking agent B includes a prepolymer with a vinyl side chain and a crosslinking agent poly(dimethyl-methylhydrogenosiloxane). After the PDMS main agent is dispersed evenly in the solution, the PDMS auxiliary agent is added to make a crosslinking reaction evenly conducted in the solution. A mass ratio of the main agent and the auxiliary agent is 10:1.

Figure 5:
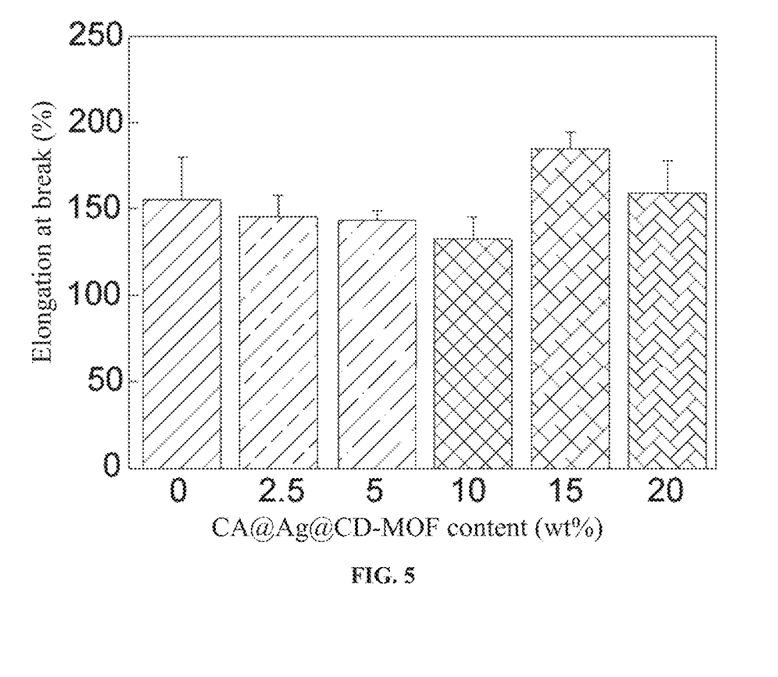
FIG. 5 shows an effect of the addition of different mass fractions of the compound 1 on an elongation at break of the compound 2.
Figure 6:
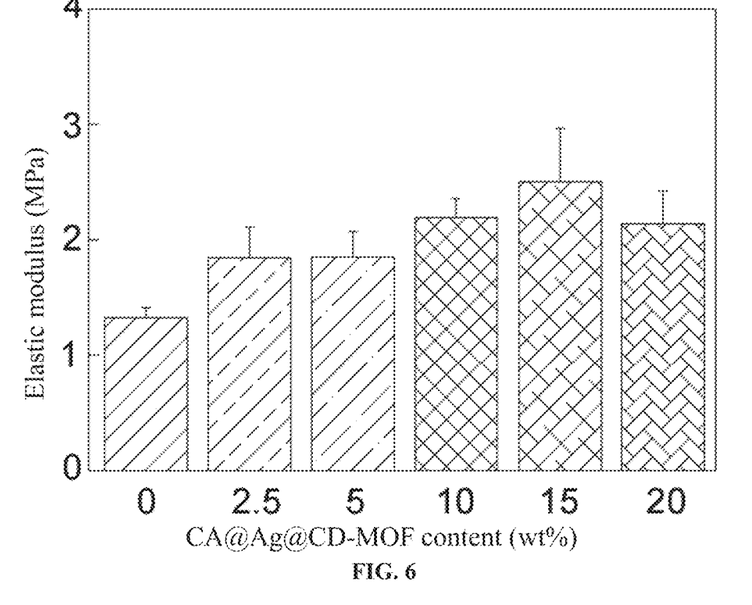
FIG. 6 shows an effect of the addition of different mass fractions of the compound 1 on an elastic modulus of the compound 2.
Figure 7:
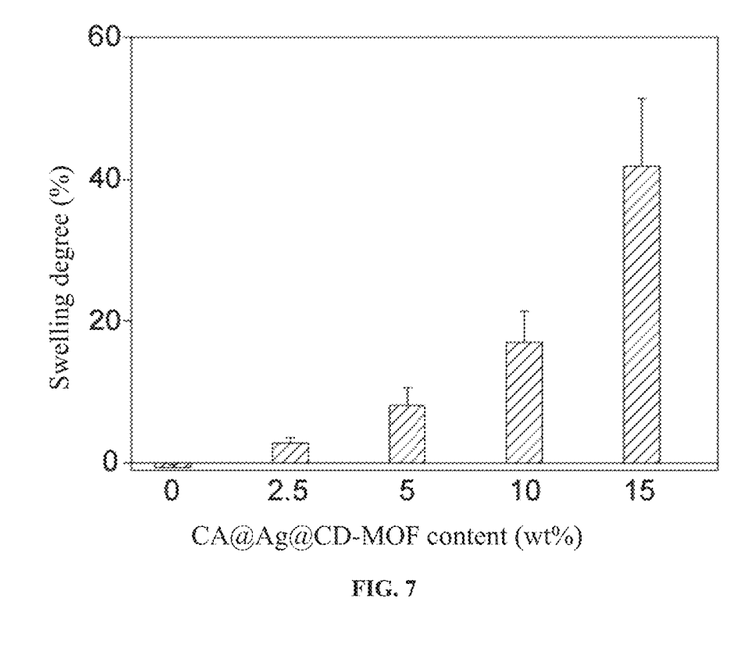
FIG. 7 shows an effect of the addition of different mass fractions of the compound 1 on a swelling degree in water of the compound 2.

The elongation at break, elastic modulus and swelling degree in water of the mixed matrix-based films prepared with different mass fractions of the CD-MOF (CA@Ag@CD-MOF) are shown in FIG. 5, FIG. 6, and FIG. 7 respectively.

The results in FIG. 5 show that the addition of CD-MOF (CA@Ag@CD-MOF) basically does not affect the elongation at break, and the more preferred addition amount has a better elongation at break than that without addition. The results in FIG. 6 show that the addition of CD-MOF (CA@Ag@CD-MOF) can increase the elastic modulus of the film, where the elastic modulus has an ideal increase at 10% to 20% and a maximum increase at 15%.

The results in FIG. 7 show that the addition of CD-MOF (CA@Ag@CD-MOF) can significantly increase the swelling degree of the film; with the increase of the addition amount of CD-MOF (CA@Ag@CD-MOF), the swelling degree of the film gradually increases, and reaches about 40% at the addition amount of 15%.

The following is an example of the optimal reaction conditions:

Example 1

(1) γ-cyclodextrin (648 mg, 0.5 mmol), potassium hydroxide (256 mg, 4.56 mmol), and ultrapure water (20 mL) were added to a beaker, stirred at room temperature and filtered with a 0.45 μm aqueous filter membrane to obtain a solution 1;

(2) methanol (12 mL) was placed in an ultrasonic tube in advance, then the solution 1 was placed in the ultrasonic tube to form a milky white solution 2. The ultrasonic tube was placed into a water bath at 60° C., and allowed to stand for 15 min to obtain a clear and transparent solution 3;

(3) the solution 3 was subjected to ultrasonic treatment, and polyethylene glycol (8000) (256 mg) was added rapidly after the ultrasonic treatment was started, and a crude product was obtained after the reaction was completed;

(4) the crude product was transferred from the ultrasonic tube to the beaker, and allowed to stand for 1 h to obtain a precipitate, the precipitate was washed three times with methanol by centrifugation, and after centrifugal separation, a new precipitate was dispersed in the methanol;

(5) a centrifuged product was put into a vacuum drying oven, dried at 50° C. for 12 h under vacuum conditions, and cooled to room temperature to obtain a CD-MOF material;

(6) 100 mg of the CD-MOF material was added into 5 mL of silver nitrate ethanol solution with a concentration of 7.5 mM, and incubated at 37° C. and 180 rpm for 12 h by shaking in a shaker in the dark;

(7) an incubated solution was centrifuged twice at 5,000 rpm, a supernatant was discarded, and a residual solvent was dried with a filter paper to obtain a precipitate; the precipitate was vacuum-dried at 50° C. for 5 h to obtain a CD-MOF loaded with nano-silver;

(8) 50 mg of the CD-MOF loaded with nano-silver was added into 50 mL of caffeic acid ethanol solution with a concentration of 8 mg/mL, and incubated at room temperature and 180 rpm for 15 h by magnetic stirring in the dark;

an incubated solution was centrifuged at 5,000 rpm, a supernatant was discarded, and a residual solvent was dried with a filter paper to obtain a precipitate; the precipitate was vacuum-dried at 50° C. for 5 h to obtain a CD-MOF compound 1 loaded with caffeic acid and nano-silver, namely an intermediate material B;

533 mg of the compound 1 was added into 75 mL of acetonitrile and stirred evenly, 0.3 mL of a PDMS main agent (in the reaction system, the mass fraction of the compound 1 (intermediate material B) was 15 wt %) was added and stirred evenly, then 0.03 mL of PDMS auxiliary agent was added; a mixed solution was mixed well by stirring for about 10 h, poured on a 12 mm polytetrafluoroethylene petri dish in diameter, the mixed solution was levelled, and dried at room temperature overnight; and the polytetrafluoroethylene petri dish was vacuum-dried at 90° C. for 4 h, a prepared product was gently scraped off with a scraper, washed with ethanol, and dried to obtain a compound 2.

Figure 1:
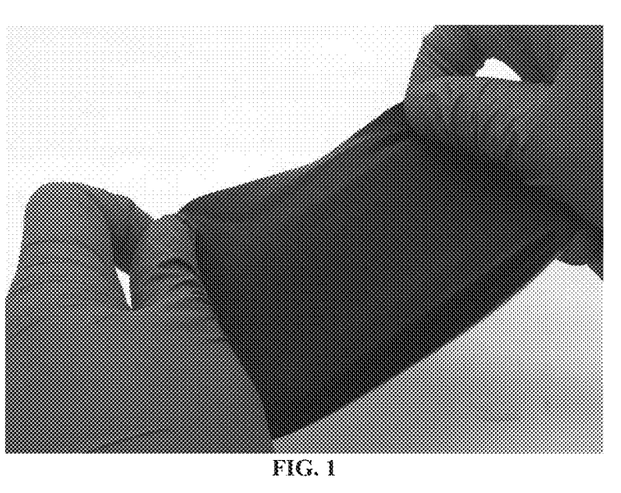
FIG. 1 is a physical image of a compound 2 in Example 1.
Figure 3:
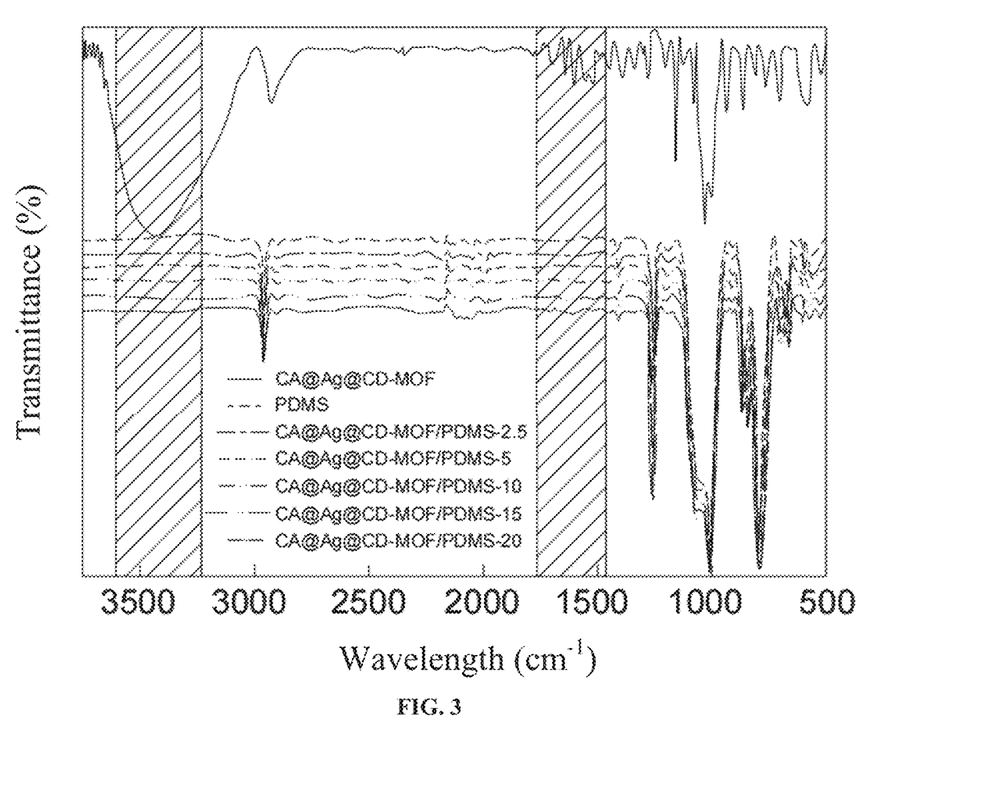
FIG. 3 shows infrared spectra of the compound 2 based on different mass fractions of a compound 1.
Figure 4:
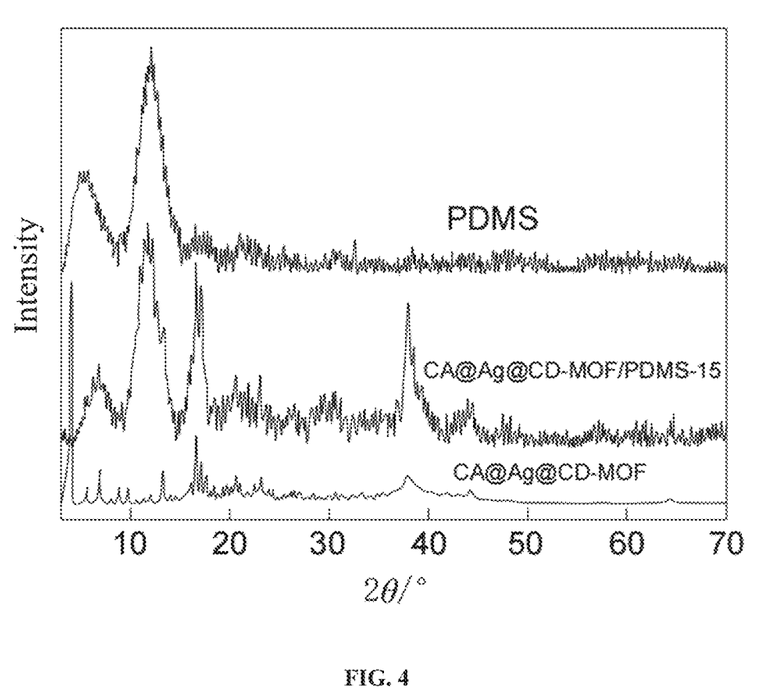
FIG. 4 shows an X-ray diffraction (XRD) pattern of the compound 2 in Example 1.

A physical image of the compound 2 synthesized in this example is shown in FIG. 1, with desirable toughness and a dark brown surface, which are caused by the deposition of nano-silver in the compound 1. The infrared spectra of compound 1 and compound 2 are shown in FIG. 3: with the increase of the addition amount of compound 1, characteristic peaks of the compound 1 at 3400 $cm^{-1}$ and 1640 $cm^{-1}$ of the compound 2 gradually become stronger; compared with the PDMS, the compound 2 does not produce new characteristic peaks, indicating that there is no chemical interaction between the PDMS and the compound 1. The powder XRD patterns of compound 1 and compound 2 are shown in FIG. 4: a peak position in the XRD pattern of the compound 2 is consistent with that of the compound 1, compared with an amorphous pattern of the PDMS, the compound 2 has certain crystalline characteristic peaks, indicating the successful incorporation of the compound 1.

Figure 8:
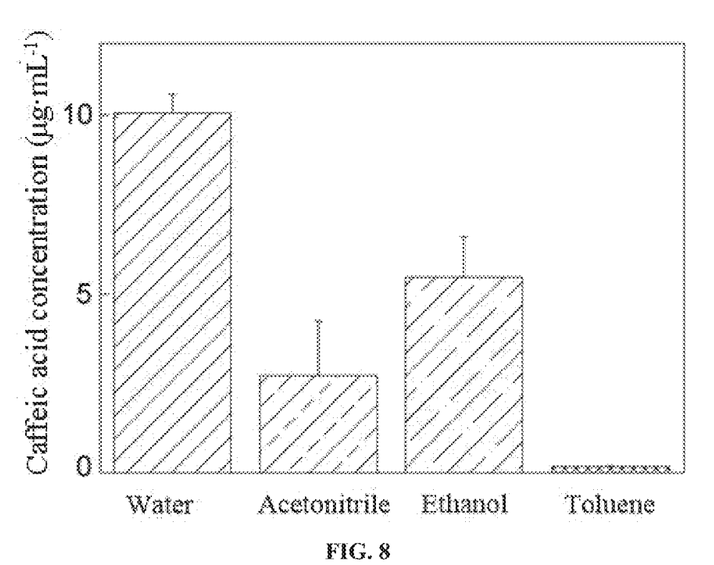
FIG. 8 shows concentration of the caffeic acid in a release solution after the compound 2 in Example 1 is released in different solvents for 48 h.
Figure 9:
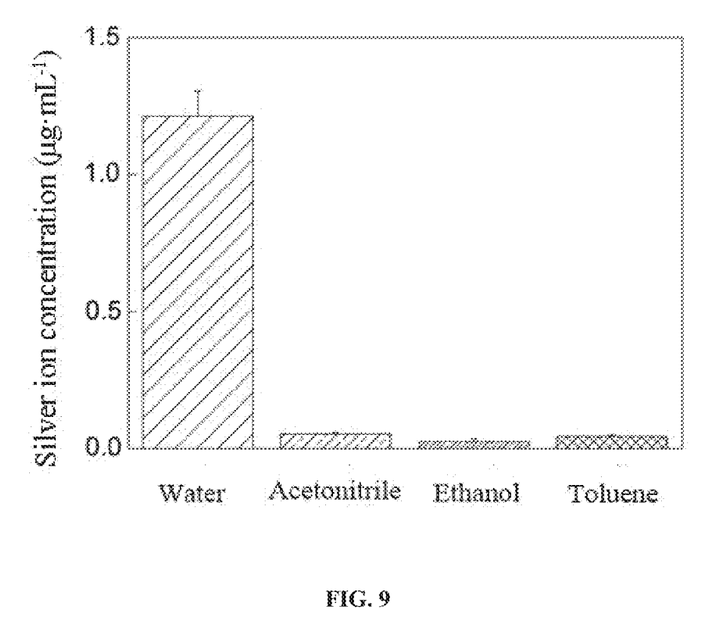
FIG. 9 shows concentration of the silver ion in a release solution after the compound 2 in Example 1 is released in different solvents for 48 h.

The concentration of the caffeic acid in the release solution after the compound 2 is released in different solvents for 48 h are shown in FIG. 8: the caffeic acid concentration of the compound 2 released in water is much greater than that of the organic solvent. The concentration of the silver ion in the release solution after the compound 2 is released in different solvents for 48 h are shown in FIG. 9: the silver ion concentration of the compound 2 released in water is much greater than that of the organic solvent. This indicated that the compound 2 have better responsiveness to water conditions.

Figure 10:
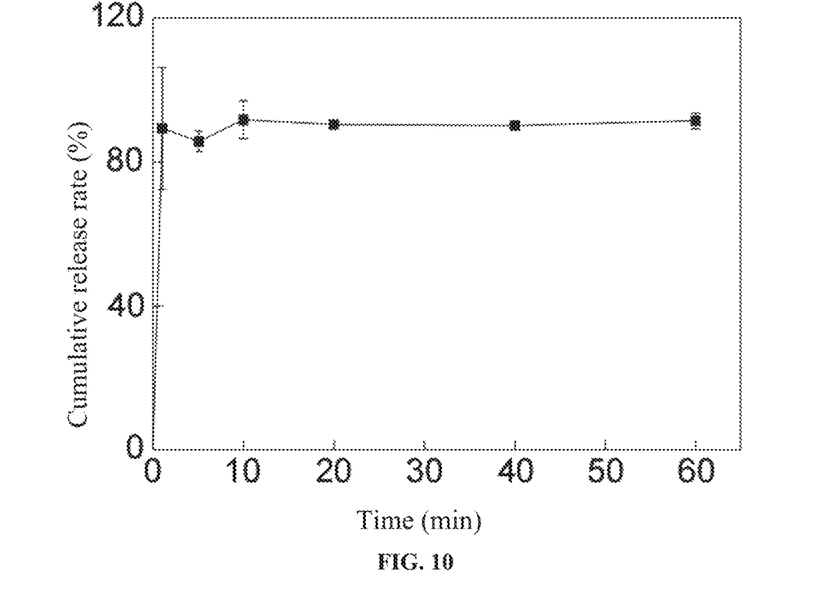
FIG. 10 shows a cumulative release rate of the compound 1 in Example 1 to the caffeic acid in water.
Figure 11:
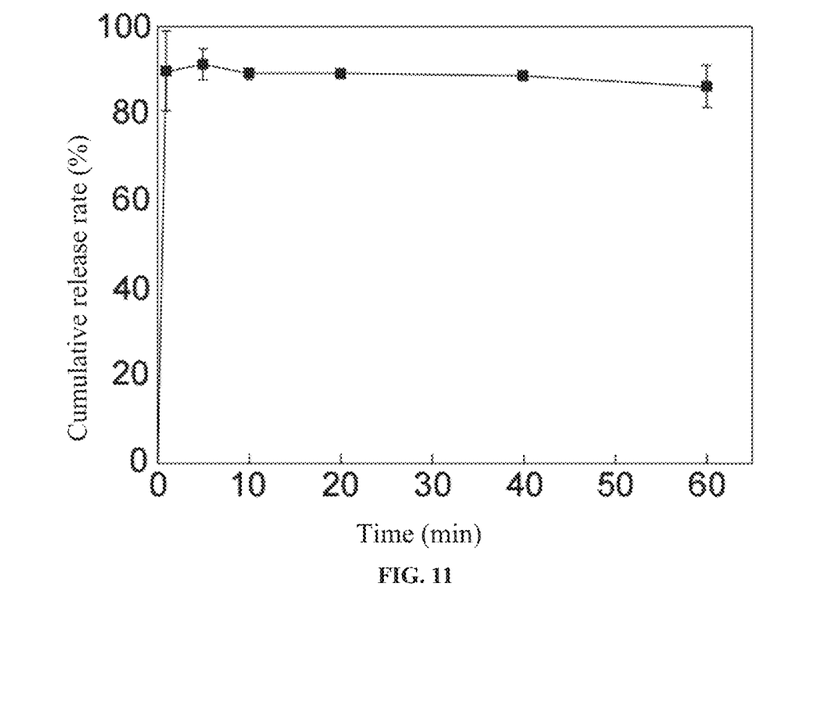
FIG. 11 shows a cumulative release rate of the compound 1 in Example 1 to the silver ions in water.
Figure 12:
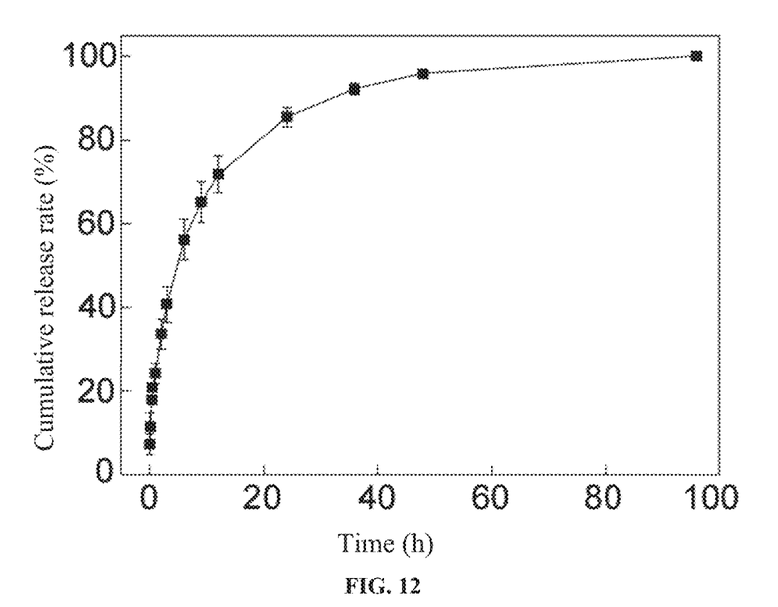
FIG. 12 shows a cumulative release rate of the compound 2 in Example 1 to the caffeic acid in water.
Figure 13:
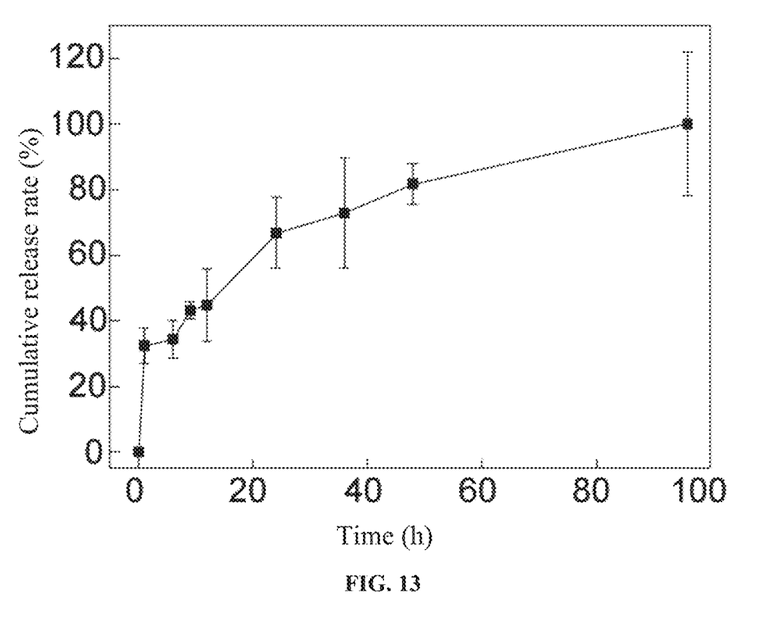
FIG. 13 shows a cumulative release rate of the compound 2 in Example 1 to the silver ions in water.

The cumulative release rate of the compound 1 to caffeic acid in water is shown in FIG. 10: the compound 1 forms a burst release of caffeic acid in about 1 min. The cumulative release rate of the compound 1 to silver ions in water is shown in FIG. 11: the compound 1 forms a burst release of silver ions in about 1 min, indicating that the compound 1 disintegrate rapidly in water, resulting in the rapid release of the loaded substance. The cumulative release rate of the compound 2 to caffeic acid in water is shown in FIG. 12: the compound 2 can achieve sustained-release of the caffeic acid within 96 h. The cumulative release rate of the compound 2 to silver ions in water is shown in FIG. 13: the compound 2 can achieve sustained-release of the silver ions within 96 h, indicating that the compound 2 can protect the CD-MOF from disintegration in water, to realize sustained-release of the loaded substance.

Figure 15:
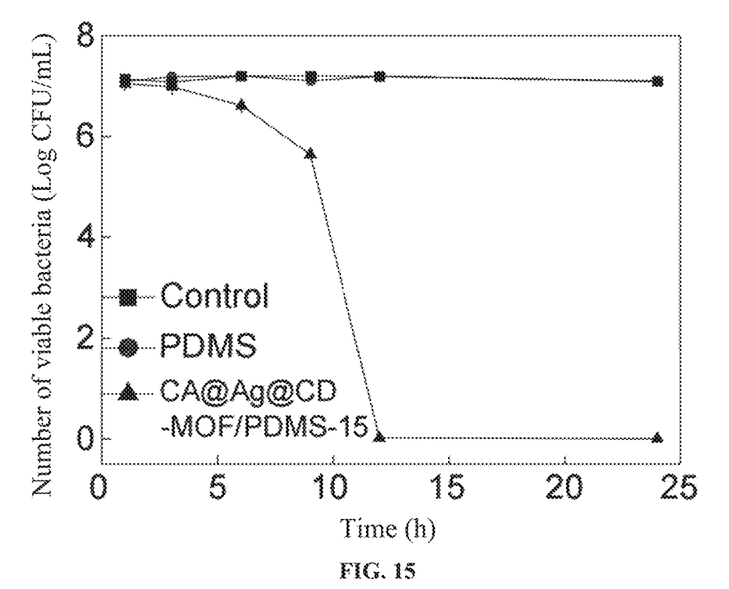
FIG. 15 shows a bactericidal lethal curve of the compound 2 in Example 1 to *Escherichia co/i* 0157:H7 in water.
Figure 16:
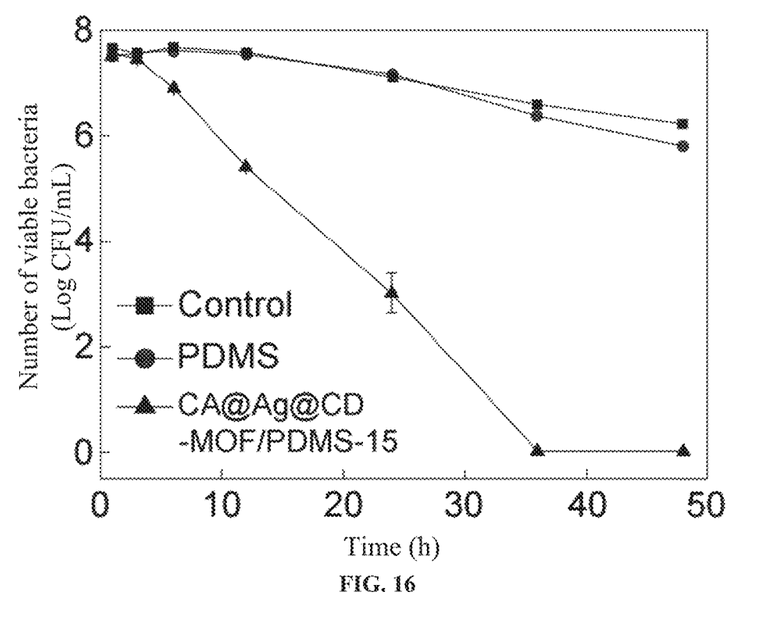
FIG. 16 shows a bactericidal lethal curve of the compound 2 in Example 1 to *Staphylococcus aureus* in water.

The bactericidal lethal curve of the compound 2 to *Escherichia coli* 0157:H7 in water is shown in FIG. 15: the compound 2 can achieve a 7 logarithmic lethal effect on the *Escherichia coli* 0157:H7 within 12 h. The bactericidal lethal curve of the compound 2 to *Staphylococcus aureus* in water is shown in FIG. 16: the compound 2 can achieve a 7 logarithmic lethal effect on the *Staphylococcus aureus* within 36 h.

Figure 2:
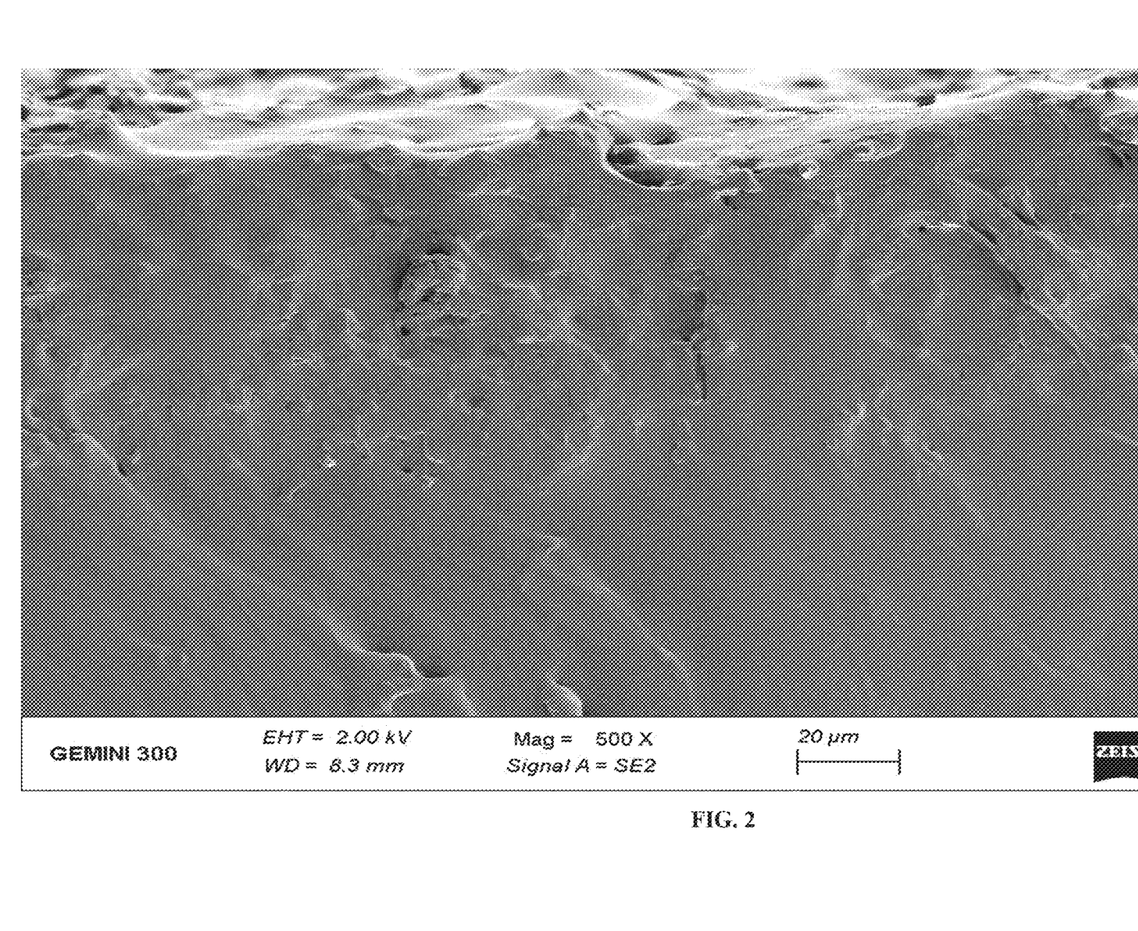
FIG. 2 is a scanning electron microscope (SEM) image of the compound 2 in Example 1.
Figure 14:
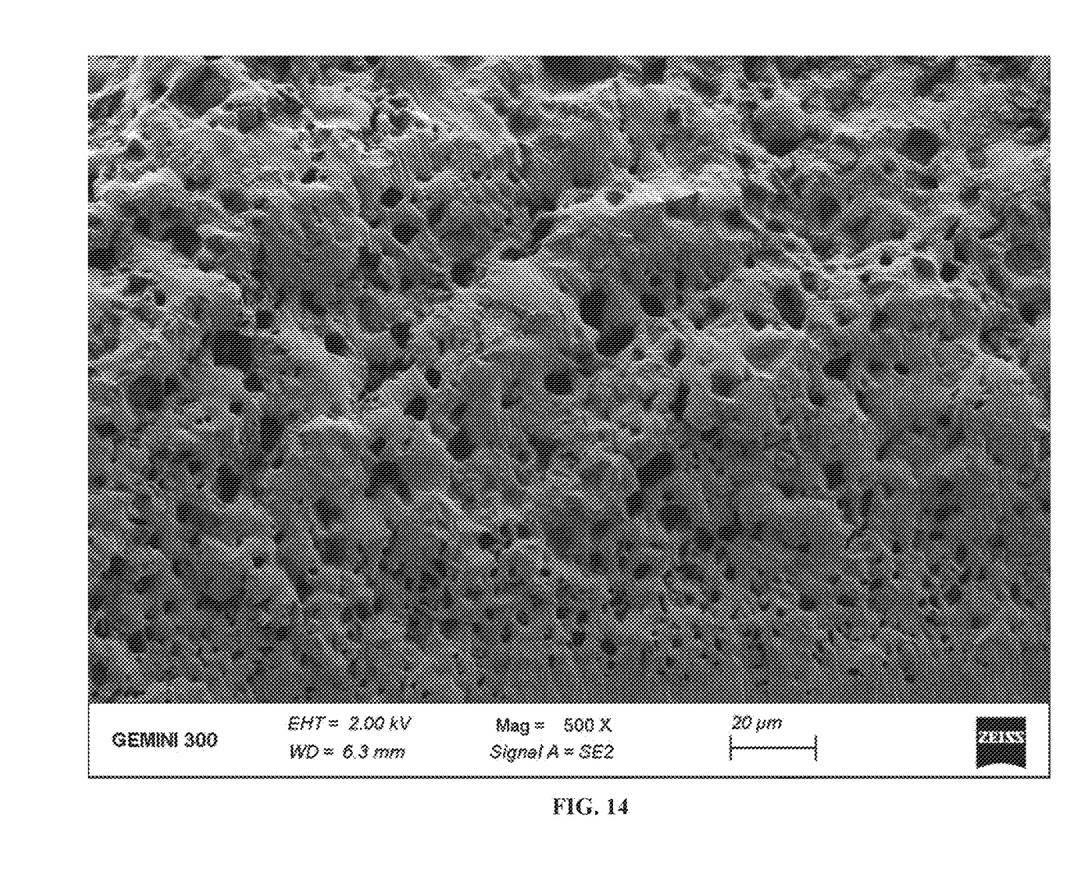
FIG. 14 is a SEM image of the compound 2 in Example 1 after being soaked in water for 48 h.

The SEM image of a cross-section of the compound 2 synthesized in this example is shown in FIG. 2: it is clearly seen that the compound 1 is embedded inside the film. The SEM image of the cross-section of the compound 2 after soaking in water for 48 h is shown in FIG. 14: it is clearly seen that the compound 1 falls off from the film and disintegrates to form pores after soaking in water. This indicates that compound 2 can achieve a release function in water.

The above only specifically and in detail describes several embodiments of the present disclosure, but they should not therefore be construed as limiting the scope of the present disclosure. It should be noted that those of ordinary skill in the art can further make variations and improvements without departing from the conception of the present disclosure. These variations and improvements all fall within the protection scope of the present disclosure. Therefore, the protection scope of the present disclosure should be subject to the protection scope defined by the claims.

What is claimed is:

1. A method for preparing a sustained-release antibacterial film, comprising the following steps:
   (1) mixing a cyclodextrin metal-organic framework (CD-MOF) material with a silver nitrate short-chain alcohol solution to prepare a nano-silver-loaded CD-MOF material, which is recorded as an intermediate material A;
   (2) mixing the intermediate material A with a caffeic acid short-chain alcohol solution to prepare a CD-MOF material loaded with nano-silver and caffeic acid, which is recorded as an intermediate material B;
   (3) dispersing the intermediate material B in a solvent, adding a polydimethylsiloxane (PDMS) prepolymer, adding a PDMS crosslinking agent after the prepolymer, and mixing by stirring for 8 h to 11 h to obtain a casting solution; and
   (4) coating the casting solution on a film support material, conducting vacuum drying, and peeling off a film from the film support material to obtain the sustained-release antibacterial film; wherein
   the short-chain alcohol is anhydrous methanol or anhydrous ethanol.

2. The method according to claim 1, wherein in step (1), a concentration of the silver nitrate short-chain alcohol solution is 0.5 mM to 10 mM; a ratio of the CD-MOF and the silver nitrate in the silver nitrate short-chain alcohol solution is 100 mg:(0.0025-0.05) mmol; and a time of the mixing is 10 h to 15 h.

3. The method according to claim 1, wherein in step (2), a concentration of caffeic acid in the caffeic acid short-chain alcohol solution is 5 mg/mL to 10 mg/mL; a mass ratio of the intermediate material A and the caffeic acid in the caffeic acid short-chain alcohol solution is 1:(0.5-1.5); and a time of the mixing is 12 h to 18 h.

4. The method according to claim 1, wherein in step (3), the solvent is selected from the group consisting of acetonitrile, n-hexane, and n-heptane; the intermediate material B is dispersed in the solvent at 5 mg/mL to 10 mg/mL; and the intermediate material B is added at 2.5% to 20% of a total mass of an obtained mixture.

5. The method according to claim 1, wherein in step (3), the PDMS prepolymer comprises a poly(dimethyl-methyl-vinylsiloxane) prepolymer and a trace amount of a platinum catalyst; the PDMS crosslinking agent comprises a prepolymer with a vinyl side chain and a crosslinking agent poly(dimethyl-methylhydrogenosiloxane); and a mass ratio of the PDMS prepolymer and the PDMS crosslinking agent is 10:1.

6. The method according to claim 1, wherein in step (4), the film support material is selected from the group consisting of polytetrafluoroethylene, polyvinylidene fluoride, and polyethersulfone resin; a coating thickness is 50 μm to 300 μm; and the vacuum drying is conducted at 85° C. to 95° C. for 3 h to 5 h.

7. The method according to claim 1, wherein step (1) and step (2) each comprise a post-treatment after the mixing, wherein the post-treatment comprises conducting centrifugation on a reaction solution, discarding a supernatant, and conducting vacuum drying.

8. The method according to claim 1, wherein a method for preparing the CD-MOF material comprises the following steps:
   ultrasonic mixing an aqueous solution dispersed with γ-cyclodextrin and potassium hydroxide and conducting a reaction in a water bath to obtain mixed solution, conducting an ultrasonic treatment on the mixed solution while adding polyethylene glycol to the mixed solution after the reaction in the water bath is completed, to obtain a crude product; and washing and drying the crude product to obtain the CD-MOF material; wherein
   in the aqueous solution, a molar ratio of the γ-cyclodextrin and the potassium hydroxide is 1:(5-10);
   a molecular weight of the polyethylene glycol is 8,000, and a molar ratio of the polyethylene glycol and the γ-cyclodextrin is (0.06-0.07):1; and
   a temperature of the reaction in the water bath is 55° C. to 65° C.

9. A sustained-release antibacterial film prepared by the preparation method according to claim 1.

* * * * *